United States Patent
Huang et al.

(10) Patent No.: US 10,496,139 B2
(45) Date of Patent: Dec. 3, 2019

(54) HINGE STRUCTURE AND ELECTRONIC DEVICE

(71) Applicant: Acer Incorporated, New Taipei (TW)

(72) Inventors: Yu-Chin Huang, New Taipei (TW); Wen-Neng Liao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/286,585

(22) Filed: Feb. 27, 2019

(65) Prior Publication Data

US 2019/0272006 A1    Sep. 5, 2019

(30) Foreign Application Priority Data

Mar. 2, 2018   (TW) .............................. 107107004 A (51) Int. Cl.
*G06F 1/16* (2006.01)

(52) U.S. Cl.
CPC .......... *G06F 1/1681* (2013.01); *G06F 1/1656* (2013.01); *Y10T 16/54028* (2015.01)

(58) Field of Classification Search
CPC ............. G06F 1/1681; Y10T 16/54028; Y10T 16/540255; Y10T 16/5387; Y10T 16/54038
See application file for complete search history.

(56) References Cited

U.S. PATENT DOCUMENTS

| | | | | |
|---|---|---|---|---|
| 1,416,656 | A * | 5/1922 | Lyman ....................... | B60J 1/04 16/330 |
| 6,920,670 | B2 * | 7/2005 | Hao ....................... | G06F 1/1616 16/337 |
| 7,171,726 | B2 * | 2/2007 | Kleissen ................. | B60R 1/074 16/235 |
| 7,493,675 | B2 * | 2/2009 | Lin ..................... | H04M 1/0216 16/262 |
| 7,565,719 | B2 * | 7/2009 | Su ......................... | E05D 11/087 16/337 |
| 7,669,286 | B2 * | 3/2010 | Lu ......................... | G06F 1/1616 16/337 |
| 8,020,254 | B2 * | 9/2011 | Lin ....................... | E05D 11/087 16/231 |
| 8,079,114 | B2 * | 12/2011 | Fries ....................... | E05D 7/02 16/243 |

(Continued)

*Primary Examiner* — Adrian S Wilson
(74) *Attorney, Agent, or Firm* — JCIPRNET (57) ABSTRACT

A hinge structure including a first fixing component, a second fixing component, a shaft, a first positioning component, and a second positioning component is provided. The shaft passes through the first fixing component and the second fixing component. The first positioning component is connected to the second fixing component, wherein the shaft passes through the first positioning component, and the first positioning component includes a positioning elastic piece. The shaft passes through the second positioning component, wherein the positioning elastic piece faces toward the second positioning component, and a side of the second positioning component facing toward the positioning elastic piece is configured with a plurality of positioning slots arranged circularly. The positioning elastic piece is configured to engage in any one of the positioning slots to lock an opened/closed state of the second fixing component and the first fixing component. An electronic device is also provided.

10 Claims, 7 Drawing Sheets

(56) References Cited

U.S. PATENT DOCUMENTS

| | | | | |
|---|---|---|---|---|
| 8,302,260 | B2* | 11/2012 | Chen | G06F 1/1681 16/303 |
| 8,544,151 | B2* | 10/2013 | Courbon | E05D 11/1078 16/334 |
| 8,584,320 | B2* | 11/2013 | Lin | G06F 1/1681 16/303 |
| 2005/0039301 | A1* | 2/2005 | Lu | G06F 1/1616 16/321 |
| 2006/0075603 | A1* | 4/2006 | Hsieh | H04M 1/0216 16/330 |
| 2010/0000047 | A1* | 1/2010 | Chang | G06F 1/1616 16/334 |
| 2011/0023271 | A1* | 2/2011 | Shen | E05D 11/087 16/334 |
| 2011/0035904 | A1* | 2/2011 | Chung | G06F 1/1681 16/334 |
| 2015/0362958 | A1* | 12/2015 | Shang | G06F 1/1681 361/679.58 |
| 2017/0122018 | A1* | 5/2017 | Huang | E05D 3/02 |

\* cited by examiner

HINGE STRUCTURE AND ELECTRONIC DEVICE

CROSS-REFERENCE TO RELATED APPLICATION

This application claims the priority benefit of Taiwan application serial no. 107107004, filed on Mar. 2, 2018. The entirety of the above-mentioned patent application is hereby incorporated by reference herein and made a part of this specification.

BACKGROUND OF THE INVENTION

Field of the Invention

The disclosure relates to a hinge structure and an electronic device, and in particular, to a hinge structure and an electronic device using the hinge structure.

Description of Related Art

In current electronic devices such as notebook computers, a hinge structure is often pivotally connected to a first body (i.e., the part where a keyboard is located) and a second body (i.e., the part where a display screen is located). In other words, the second body may be rotated with respect to the first body via the hinge structure, and an opened/closed state of the second body and the first body may be locked by the hinge structure.

Due to the prevalence of electronic sports and the demand from gamers, the size of gaming notebook computers has constantly been increasing. To properly lock the opened/closed state of the second body and the first body of the gaming notebook computer, a torsion force of its hinge structure should be increased accordingly, which causes inconvenience in opening and closing the second body and the first body. From another perspective, business or consumer notebook computers are being developed to become smaller and smaller. Therefore, when the second body and the first body are opened, the torsion force of the hinge structure may move the first body along with the second body. At this time, it requires a user to additionally apply a force to hold the first body to allow the second body to successfully rotate with respect to the first body.

SUMMARY OF THE INVENTION

The embodiments of the invention provide a hinge structure and an electronic device using the hinge structure that exhibit excellent operational convenience.

A hinge structure according to an embodiment of the invention includes a first fixing component, a second fixing component, a shaft, a first positioning component, and a second positioning component. The shaft passes through the first fixing component and the second fixing component. The first positioning component is connected to the second fixing component, wherein the shaft passes through the first positioning component, and the first positioning component includes a positioning elastic piece. The second positioning component is disposed in parallel with the first positioning component, and the shaft passes through the second positioning component, wherein the positioning elastic piece faces toward the second positioning component, and a side of the second positioning component facing toward the positioning elastic piece is configured with a plurality of positioning slots arranged circularly. The positioning elastic piece is configured to engage in any one of the positioning slots to lock an opened/closed state of the second fixing component and the first fixing component.

An electronic device according to an embodiment of the invention includes a first body, a second body, and a hinge structure. The hinge structure is pivotally connected to the first body and the second body. The hinge structure includes a first fixing component, a second fixing component, a shaft, a first positioning component, and a second positioning component. The first fixing component is fixed to the first body. The second fixing component is fixed to the second body. The shaft passes through the first fixing component and the second fixing component. The first positioning component is connected to the second fixing component, wherein the shaft passes through the first positioning component, and the first positioning component includes a positioning elastic piece. The second positioning component is disposed in parallel with the first positioning component, and the shaft passes through the second positioning component, wherein the positioning elastic piece faces toward the second positioning component, and a side of the second positioning component facing toward the positioning elastic piece is configured with a plurality of positioning slots arranged circularly. The positioning elastic piece is configured to engage in any one of the positioning slots to lock an opened/closed state of the second body and the first body.

Based on the above, the hinge structure adopted in the electronic device of the embodiments of the invention achieves a design that requires less force to open and greater force to close through the first positioning component and the second positioning component configured relatively to each other. The design not only facilitates user operations but also prevents the spread second body from rotating and dropping with respect to the first body.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
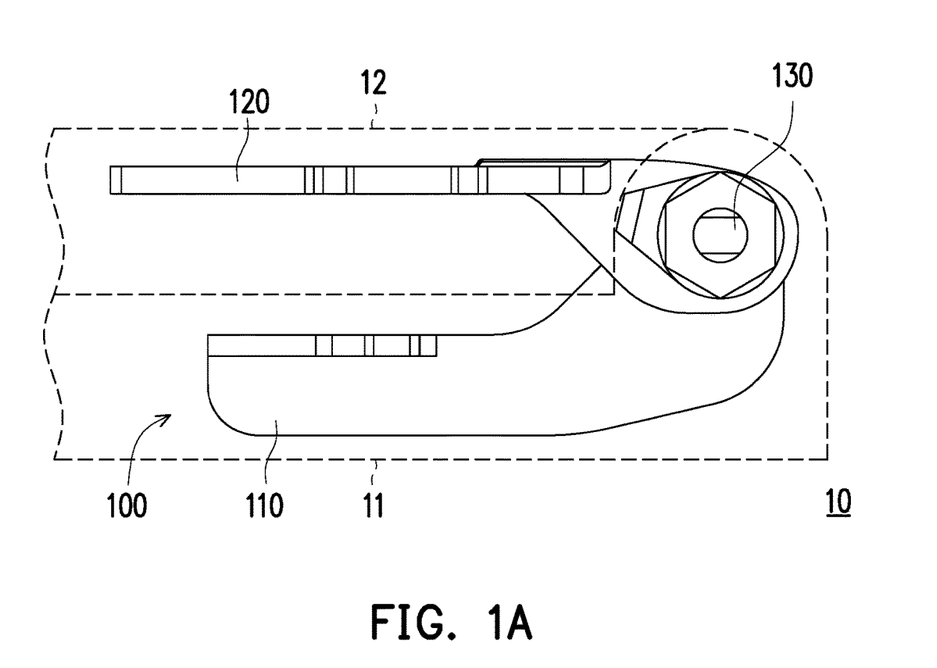
FIG. 1A is a side-view schematic diagram illustrating an electronic device according to an embodiment of the invention.
Figure 1B:
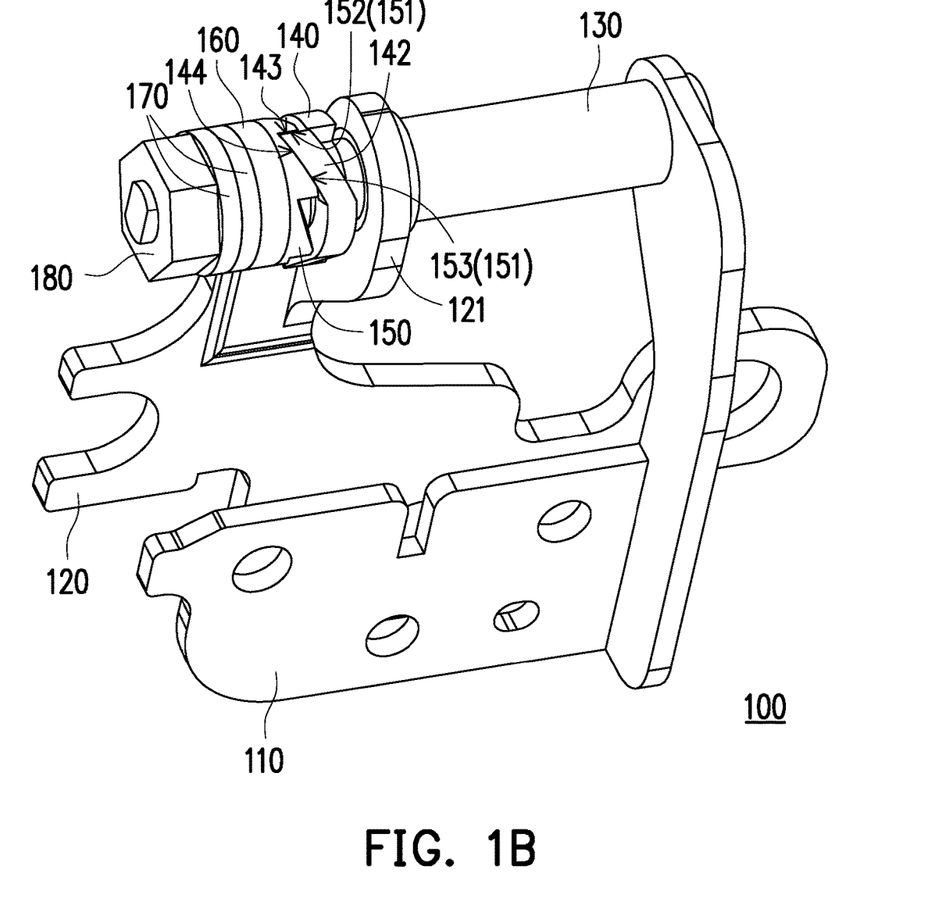
FIG. 1B is a structural schematic diagram illustrating a hinge structure of FIG. 1A.
Figure 1C:
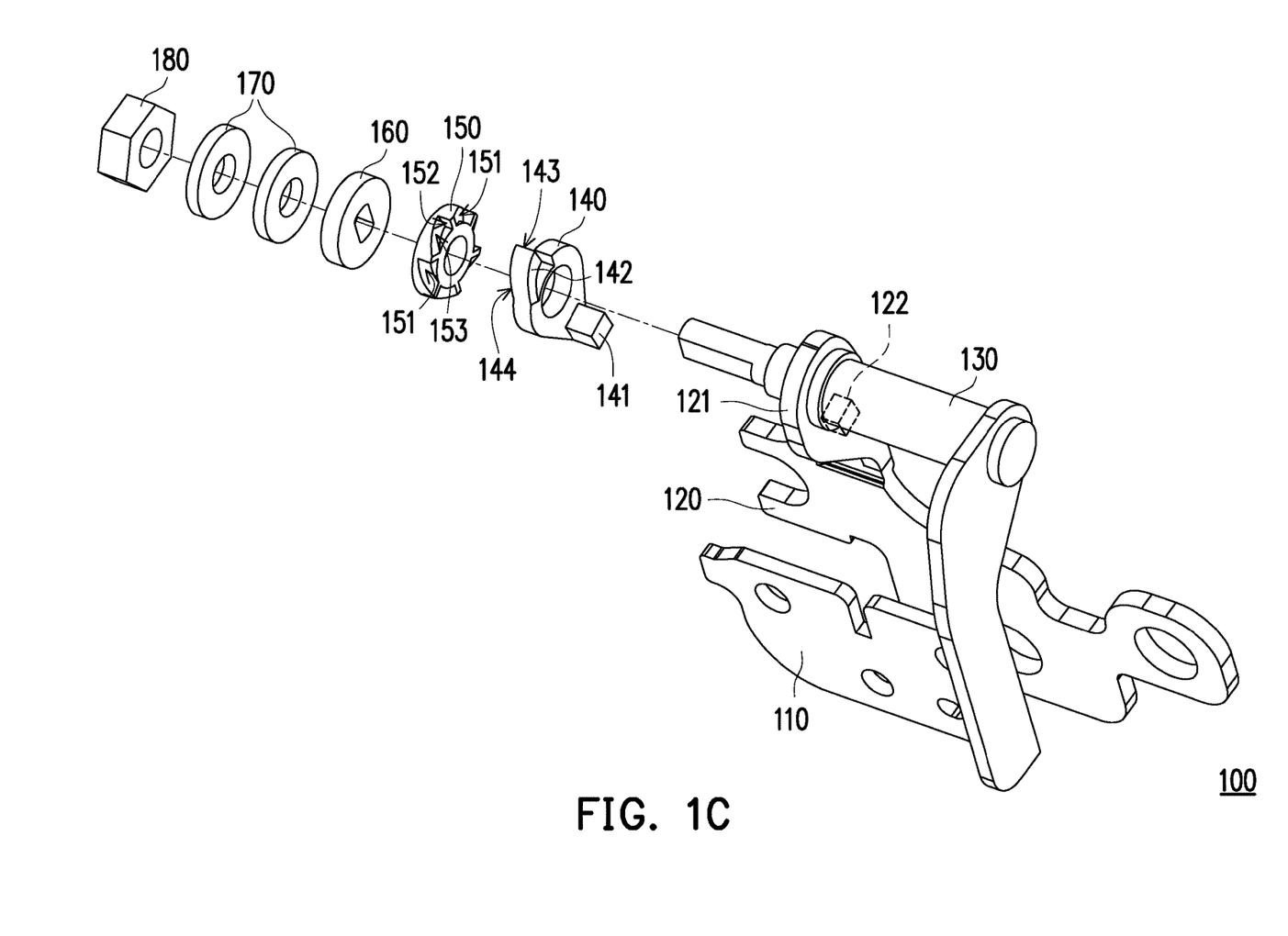
FIG. 1C is an exploded schematic diagram illustrating the hinge structure of FIG. 1A.

FIG. 1A is a side-view schematic diagram illustrating an electronic device according to an embodiment of the invention. FIG. 1B is a structural schematic diagram illustrating a hinge structure of FIG. 1A. FIG. 1C is an exploded schematic diagram illustrating the hinge structure of FIG. 1A. For ease of description and clarity of illustration, a first body 11 and a second body 12 of FIG. 1A are schematically illustrated in broken lines. Referring to FIG. 1A to FIG. 1C, in the present embodiment, an electronic device 10 includes the first body 11, the second body 12, and a hinge structure 100 pivotally connected to the first body 11 and the second body 12. Specifically, the first body 11 may be a host of a notebook computer, and the second body 12 may be a display of the notebook computer.

The hinge structure 100 includes a first fixing component 110, a second fixing component 120, a shaft 130, a first positioning component 140, and a second positioning component 150. Specifically, the shaft 130 passes through the first fixing component 110 and the second fixing component 120 to fix relative positions of the first fixing component 110 and the second fixing component 120, and the second fixing component 120 can be rotated with respect to the shaft 130. The first fixing component 110 is fixed to the first body 11, and the second fixing component 120 is fixed to the second body 12. In a case where the first fixing component 110 and the first body 11 stay unmoved, a user may apply a force to the second body 12 to cause the second body 12 and the second fixing component 120 to be rotated with respect to the shaft 130 (also referred to as being rotated with respect to the first fixing component 110 and the first body 11) to switch an opened/closed state of the electronic device 10.

The shaft 130 passes through the first positioning component 140. The second fixing component 120 includes a sleeve portion 121, and the sleeve portion 121 is rotatably sleeved on the shaft 130. The sleeve portion 121 has an engagement hole 122. The first positioning component 140 includes an engagement protrusion 141, and the engagement protrusion 141 is engaged in the engagement hole 122. In other words, the first positioning component 140 is fixed to the second fixing component 120 by means of engagement. In other embodiments, the first positioning component may be integrally formed with the second fixing component.

In the present embodiment, the first positioning component 140 includes a positioning elastic piece 142. The second positioning component 150 is disposed in parallel with the first positioning component 140, and the shaft 130 passes through the second positioning component 150. The sleeve portion 121 and the second positioning component 150 are respectively located at two opposite sides of the first positioning component 140, and the second positioning component 150 is rotatably sleeved on the shaft 130. The hinge structure 100 further includes a torsion component 160, at least one elastic piece 170 (two are schematically illustrated), and a third fixing component 180. Specifically, the shaft 130 passes through the torsion component 160, the elastic piece 170, and the third fixing component 180. The torsion component 160 is fixed on the shaft 130. The elastic piece 170 is located between the torsion component 160 and the third fixing component 180. The third fixing component 180 is locked to an end of the shaft 130.

Furthermore, the positioning elastic piece 142 faces toward the second positioning component 150, and a side of the second positioning component 150 facing toward the positioning elastic piece 142 is configured with a plurality of positioning slots 151 arranged circularly. The torsion component 160 and the first positioning component 140 are respectively located at two opposite sides of the second positioning component 150, and the torsion component 160 is abutted against the other side of the second positioning component 150 facing away from the positioning elastic piece 142. Since the torsion component 160 is sleeved on the shaft 130 in a fixed manner, and the torsion component 160 is abutted against the other side of the second positioning component 150 facing away from the positioning elastic piece 142, when the second positioning component 150 is rotated with respect to the shaft 130, a resistive force is generated between the torsion component 160 and the second positioning component 150.

On the other hand, the elastic piece 170 is disposed in parallel with the torsion component 160 and is abutted against the torsion component 160. The elastic piece 170 and the second positioning component 150 are respectively located at two opposite sides of the torsion component 160. The third fixing component 180 is disposed in parallel with the elastic piece 170 and is abutted against the elastic piece 170. The third fixing component 180 and the torsion component 160 are respectively located at two opposite sides of the elastic piece 170. Due to an allowance of elastic deformation of the elastic piece 170, it is ensured that the torsion component 160 is always abutted against the other side of the second positioning component 150 facing away from the positioning elastic piece 142. Moreover, the third fixing component 180 is locked to the end of the shaft 130, which thus prevents the elastic piece 170, the torsion component 160, and the second positioning component 150 from falling off the shaft 130 and ensures the abutting relationships among the elastic piece 170, the torsion component 160, the second positioning component 150, and the first positioning component 140.

Referring to FIG. 1B and FIG. 1C, the first positioning component 140 and the second positioning component 150 are abutted against each other, and the positioning elastic piece 142 of the first positioning component 140 is engaged in one of the positioning slots 151 of the second positioning component 150 to lock the second body 12 (and the second fixing component 120 fixed thereon) and the first body 11 (and the first fixing component 110 fixed thereon) in a closed state shown in FIG. 1A. In the present embodiment, the positioning elastic piece 142 includes a first stop surface 143 and a first guiding slope 144 connected to each other, and each of the positioning slots 151 includes a second stop surface 152 and a second guiding slope 153 connected to each other. A geometric contour of the first stop surface 143 and a geometric contour of the second stop surface 152 may be complementary, and a geometric contour of the first guiding slope 144 and a geometric contour of the second guiding slope 153 may be complementary. When the positioning elastic piece 142 is engaged in one of the positioning slots 151, the first stop surface 143 and the second stop surface 152 are abutted against each other, and the first guiding slope 144 and the second guiding slope 153 are abutted against each other.

Figure 2A:
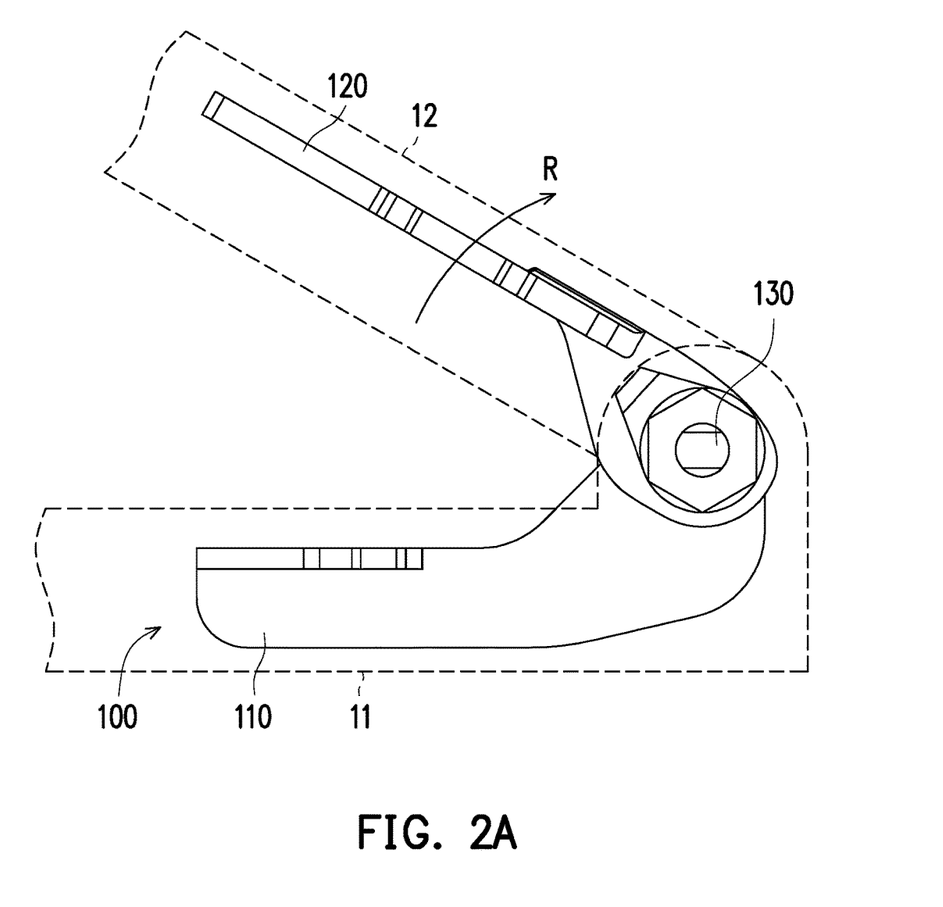
FIG. 2A is a side-view schematic diagram illustrating the electronic device of FIG. 1A switched to another state.
Figure 2B:
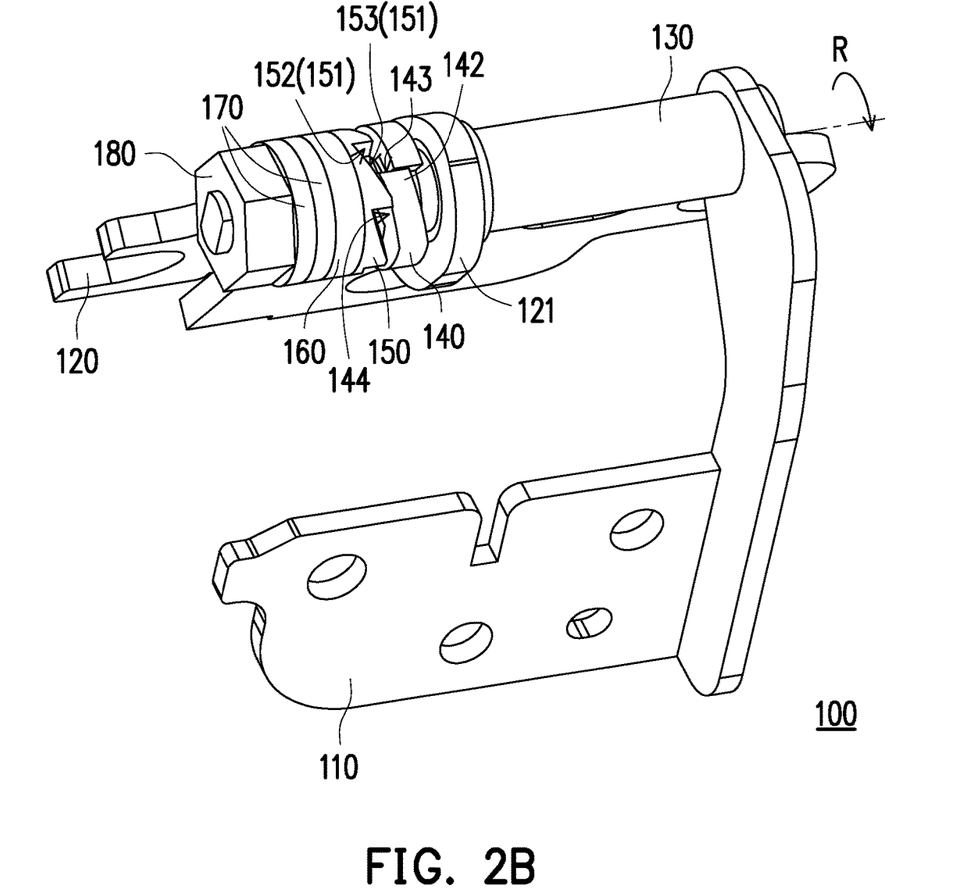
FIG. 2B is a structural schematic diagram illustrating the hinge structure of FIG. 2A.

FIG. 2A is a side-view schematic diagram illustrating the electronic device of FIG. 1A switched to another state. FIG. 2B is a structural schematic diagram illustrating the hinge structure of FIG. 2A. For ease of description and clarity of illustration, the first body 11 and the second body 12 of FIG. 2A are schematically illustrated in broken lines. In addition to the foregoing drawings, referring to both FIG. 2A and FIG. 2B, the second body 12 is rotated with respect to the first body 11 along a rotation direction R, such that the electronic device 10 in the closed state shown in FIG. 1A is spread. In the process where the second body 12 is rotated with respect to the first body 11 along the rotation direction R, the second fixing component 120 is rotated along with the second body 12 with respect to the shaft 130 along the rotation direction R, and the first positioning component 140 on the second fixing component 120 is rotated with respect to the shaft 130 and the second positioning component 150 along the rotation direction R. At this time, the second positioning component 150 stays unmoved due to the resistive force of the torsion component 160. On the other hand, the positioning elastic piece 142 is rotated along with the first positioning component 140. The first guiding slope 144 of the positioning elastic piece 142 is slid along the second guiding slope 153 of the positioning slot 151, and the first stop surface 143 of the positioning elastic piece 142 is moved toward a direction away from the second stop surface 152 of the positioning slot 151.

In the process where the first guiding slope 144 of the positioning elastic piece 142 is slid along the second guiding slope 153 of the positioning slot 151, and the first stop surface 143 of the positioning elastic piece 142 is moved toward the direction away from the second stop surface 152 of the positioning slot 151, since a height of the second guiding slope 153 of the positioning slot 151 is gradually increased, the positioning elastic piece 142 is compressed and undergoes elastic deformation to thereby move out of the positioning slot 151. In the process of moving the positioning elastic piece 142 out of the positioning slot 151, since almost no resistive force is generated between the first positioning component 140 and the second positioning component 150, the user can easily spread the second body 12 with respect to the first body 10 without applying much force.

Figure 3A:
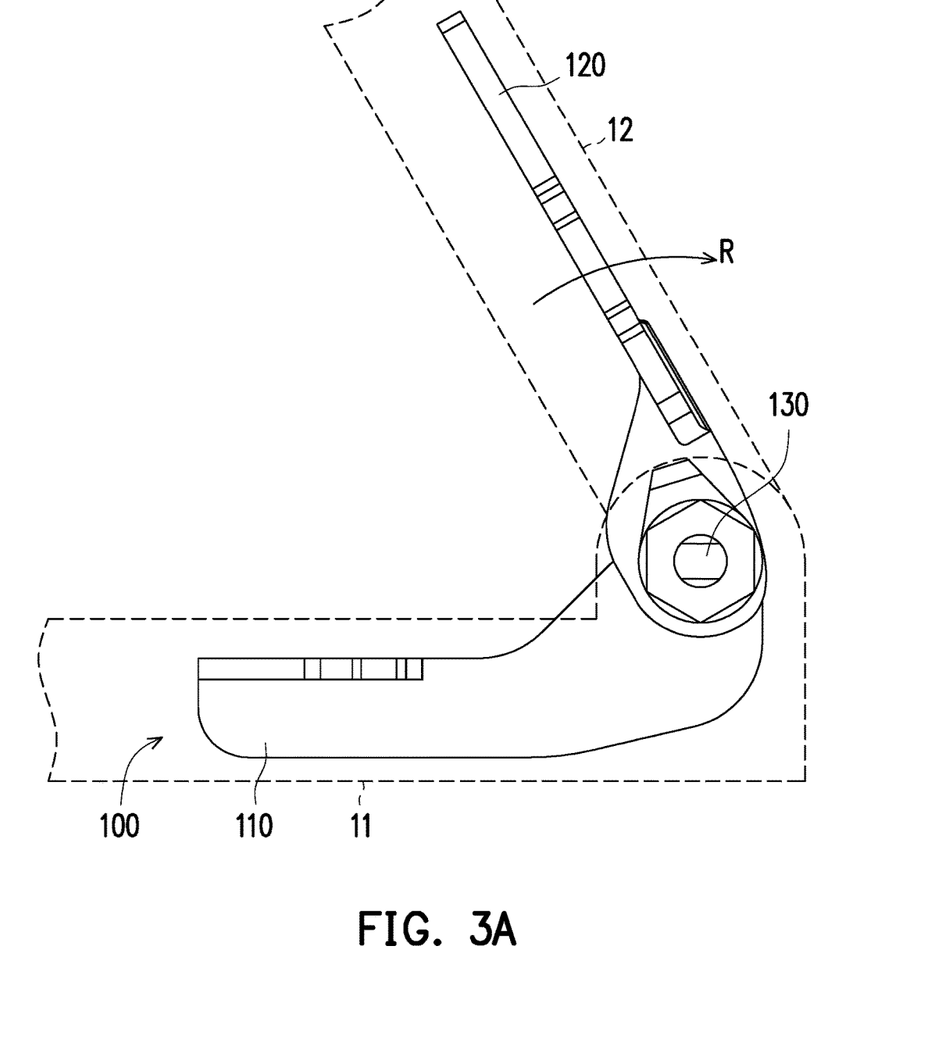
FIG. 3A is a side-view schematic diagram illustrating the electronic device of FIG. 2A switched to another state.
Figure 3B:
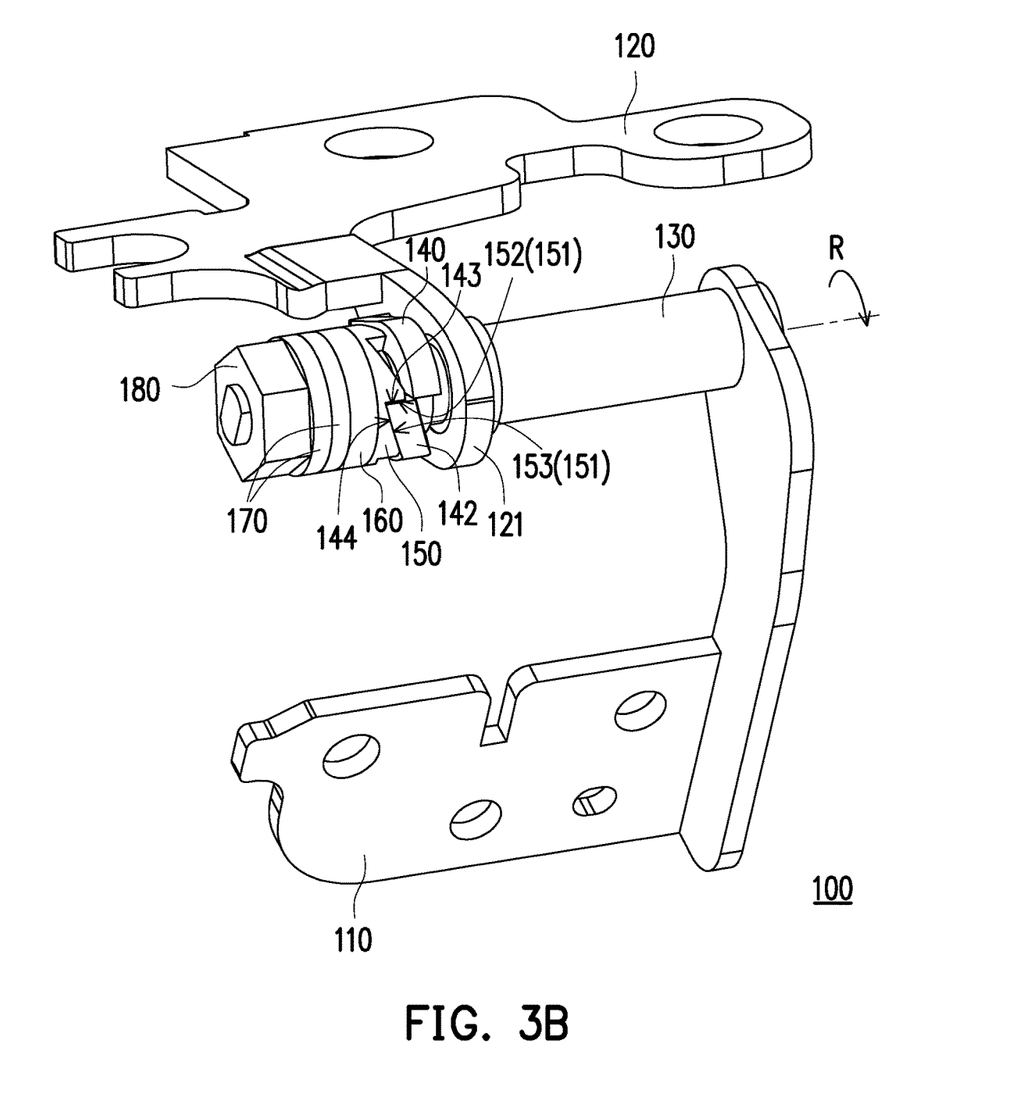
FIG. 3B is a structural schematic diagram illustrating the hinge structure of FIG. 3A.

FIG. 3A is a side-view schematic diagram illustrating the electronic device of FIG. 2A switched to another state. FIG. 3B is a structural schematic diagram illustrating the hinge structure of FIG. 3A. For ease of description and clarity of illustration, the first body 11 and the second body 12 of FIG. 3A are schematically illustrated in broken lines. In addition to the foregoing drawings, referring to both FIG. 3A and FIG. 3B, the second body 12 continues to be rotated with respect to the first body 11 along the rotation direction R, such that the electronic device 10 in a transitional state shown in FIG. 2A is switched to an opened state shown in FIG. 3A. Specifically, after the compressed and deformed positioning elastic piece 142 is slid to pass an apex of the second guiding slope 153 of the positioning slot 151, the positioning elastic piece 142 is restored to the uncompressed and undeformed state due to an elastic recovery force and is further engaged in the next positioning slot 151 to lock the second body 12 (and the second fixing component 120 fixed thereon) and the first body 11 (and the first fixing component 110 fixed thereon) in the opened state shown in FIG. 3A. At this time, the first stop surface 143 of the positioning elastic piece 142 and the second stop surface 152 of the positioning slot 151 are abutted against each other, and the first guiding slope 144 of the positioning elastic piece 142 and the second guiding slope 153 of the positioning slot 151 are abutted against each other. Due to the structural interference between the positioning elastic piece 142 and the positioning slot 151 and the resistive force between the second positioning component 150 and the torsion component 160, the second body 12 does not easily rotate and drop with respect to the first body 11.

Conversely, as the second body 12 is rotated with respect to the first body 11 along a direction reverse to the rotation direction R, the second fixing component 120 is rotated along with the second body 12 with respect to the shaft 130 along the direction reverse to the rotation direction R, and the first positioning component 140 on the second fixing component 120 is rotated with respect to the shaft 130 and the second positioning component 150 along the direction reverse to the rotation direction R. Due to the structural interference between the positioning elastic piece 142 and the positioning slot 151, the second positioning component 150 is driven by the first positioning component 140 and is rotated. At this time, a resistive force is generated between the first positioning component 140 and the second positioning component 150, and a resistive force is generated between the second positioning component 150 and the torsion component 160. Therefore, it requires a greater force to rotate the second body 12 with respect to the first body 11 along the direction reverse to the rotation direction R.

In summary of the above, the hinge structure adopted in the electronic device of the embodiments of the invention achieves a design that requires less force to open and greater force to close through the first positioning component and the second positioning component configured relatively to each other. In other words, when the second body is spread with respect to the first body, the second positioning component stays unmoved, the first positioning component is rotated along with the second body, and almost no resistive force is generated between the first positioning component and the second positioning component. Therefore, the user can easily spread the second body with respect to the first body without applying much force. Conversely, when the second body is closed with respect to the first body, the first positioning component is rotated along with the second body, the second positioning component is driven by the first positioning component and is rotated, and a resistive force is generated between the first positioning component and the second positioning component. Therefore, it requires the user to apply a greater force to close the second body to the first body.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A hinge structure comprising:
   a first fixing component;
   a second fixing component;
   a shaft passing through the first fixing component and the second fixing component;
   a first positioning component connected to the second fixing component, wherein the shaft passes through the first positioning component, and the first positioning component comprises a positioning elastic piece; and
   a second positioning component disposed in parallel with the first positioning component, wherein the shaft passes through the second positioning component, the positioning elastic piece faces toward the second positioning component, a side of the second positioning component facing toward the positioning elastic piece is configured with a plurality of positioning slots arranged circularly, and the positioning elastic piece is configured to engage in any one of the positioning slots to lock an opened/closed state of the second fixing component and the first fixing component.

2. The hinge structure according to claim 1, wherein the positioning elastic piece comprises a first stop surface and a first guiding slope connected to each other, and each of the positioning slots comprises a second stop surface and a second guiding slope connected to each other, wherein when the positioning elastic piece is engaged in any one of the positioning slots, the first stop surface and the second stop surface are abutted against each other, and the first guiding slope and the second guiding slope are abutted against each other.

3. The hinge structure according to claim 1, further comprising:
   a torsion component fixed on the shaft, wherein the shaft passes through the torsion component, the torsion component and the first positioning component are respectively located at two opposite sides of the second positioning component, the torsion component is abutted against another side of the second positioning component facing away from the positioning elastic piece, and the second positioning component is rotatably sleeved on the shaft.

4. The hinge structure according to claim 3, further comprising:
   at least one elastic piece disposed in parallel with the torsion component and abutted against the torsion component, wherein the shaft passes through the elastic piece, and the elastic piece and the second positioning component are respectively located at two opposite sides of the torsion component; and
   a third fixing component disposed in parallel with the elastic piece and abutted against the elastic piece, wherein the shaft passes through the third fixing component, and the third fixing component and the torsion component are respectively located at two opposite sides of the elastic piece.

5. The hinge structure according to claim 1, wherein the second fixing component comprises a sleeve portion rotatably sleeved on the shaft, the sleeve portion has an engagement hole, the first positioning component comprises an engagement protrusion, and the engagement protrusion is engaged in the engagement hole.

6. An electronic device comprising:
   a first body;
   a second body; and
   a hinge structure pivotally connected to the first body and the second body, the hinge structure comprising:
      a first fixing component fixed to the first body;
      a second fixing component fixed to the second body;
      a shaft passing through the first fixing component and the second fixing component;
      a first positioning component connected to the second fixing component, wherein the shaft passes through the first positioning component, and the first positioning component comprises a positioning elastic piece; and
      a second positioning component disposed in parallel with the first positioning component, wherein the shaft passes through the second positioning component, the positioning elastic piece faces toward the second positioning component, a side of the second positioning component facing toward the positioning elastic piece is configured with a plurality of positioning slots arranged circularly, and the positioning elastic piece is configured to engage in any one of the positioning slots to lock an opened/closed state of the second body and the first body.

7. The electronic device according to claim 6, wherein the positioning elastic piece comprises a first stop surface and a first guiding slope connected to each other, and each of the positioning slots comprises a second stop surface and a second guiding slope connected to each other, wherein when the positioning elastic piece is engaged in any one of the positioning slots, the first stop surface and the second stop surface are abutted against each other, and the first guiding slope and the second guiding slope are abutted against each other.

8. The electronic device according to claim 6, wherein the hinge structure further comprises:
   a torsion component fixed on the shaft, wherein the shaft passes through the torsion component, the torsion component and the first positioning component are respectively located at two opposite sides of the second positioning component, the torsion component is abutted against another side of the second positioning component facing away from the positioning elastic piece, and the second positioning component is rotatably sleeved on the shaft.

9. The electronic device according to claim 8, wherein the hinge structure further comprises:
   at least one elastic piece disposed in parallel with the torsion component and abutted against the torsion component, wherein the shaft passes through the elastic piece, and the elastic piece and the second positioning component are respectively located at two opposite sides of the torsion component; and
   a third fixing component disposed in parallel with the elastic piece and abutted against the elastic piece, wherein the shaft passes through the third fixing component, and the third fixing component and the torsion component are respectively located at two opposite sides of the elastic piece.

10. The electronic device according to claim 6, wherein the second fixing component comprises a sleeve portion rotatably sleeved on the shaft, the sleeve portion has an engagement hole, the first positioning component comprises an engagement protrusion, and the engagement protrusion is engaged in the engagement hole.

* * * * *